United States Patent [19]

Runciman

[11] Patent Number: 4,594,508
[45] Date of Patent: Jun. 10, 1986

[54] RADIATION SCANNING SYSTEMS

[75] Inventor: Herbert M. Runciman, Glasgow, Scotland

[73] Assignee: Barr & Stroud Limited, Glasgow, Scotland

[21] Appl. No.: 675,391

[22] Filed: Nov. 27, 1984

[30] Foreign Application Priority Data

Dec. 6, 1983 [GB] United Kingdom ............... 8332531

[51] Int. Cl.$^4$ ............................................. G02B 26/10
[52] U.S. Cl. ............................... 250/334; 350/6.6; 350/170; 250/338
[58] Field of Search .................. 250/253, 330, 334, 347; 350/6.6, 169, 170

[56] References Cited

U.S. PATENT DOCUMENTS

| 3,287,559 | 11/1966 | Barnes | 250/334 |
| 3,371,212 | 2/1968 | Weiss | 250/347 |
| 3,592,523 | 7/1971 | Yu Wu | 350/6.6 |
| 3,971,939 | 7/1976 | Andressen | 250/347 |
| 4,103,160 | 7/1978 | Moss | 250/334 |
| 4,538,181 | 8/1985 | Taylor | 350/6.6 |

Primary Examiner—Janice A. Howell
Attorney, Agent, or Firm—Mason, Fenwick & Lawrence

[57] ABSTRACT

A radiation scan system (10) incorporates a scanning device (13) which transfers radiation between transmitting station (12) and receiving station (11) with simultaneous mapping of a point (14) in station (11) into a line (15) in station (12). Station (12) is in the form of a distant plane. Scanning device (13) has at least one mirror (16) mounted on a carrier (17) movable about an axis (18) which lies in the plane of the angular offset between the radiation beams at scan device (13) incoming from and outgoing to the stations (11,12). A refractive prism corrector (26) is located in the path of the radiation beam between scan device (13) and station (12) whereat line (15) exists, the vertex edge (27) of the prism corrector (26) being perpendicular to axis (18) and the parameter values of the prism corrector (26) are such that at least the line (15) in station (12) is straight.

10 Claims, 6 Drawing Figures

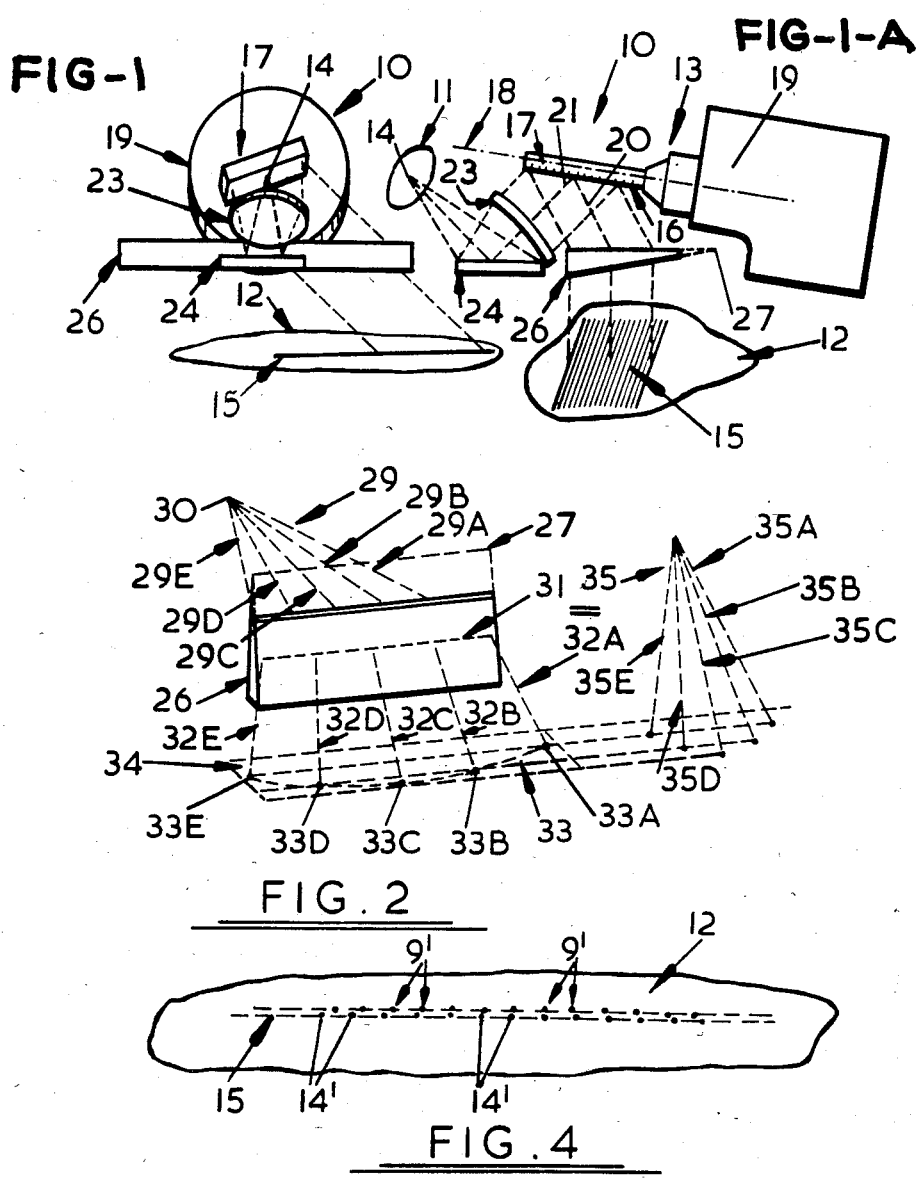

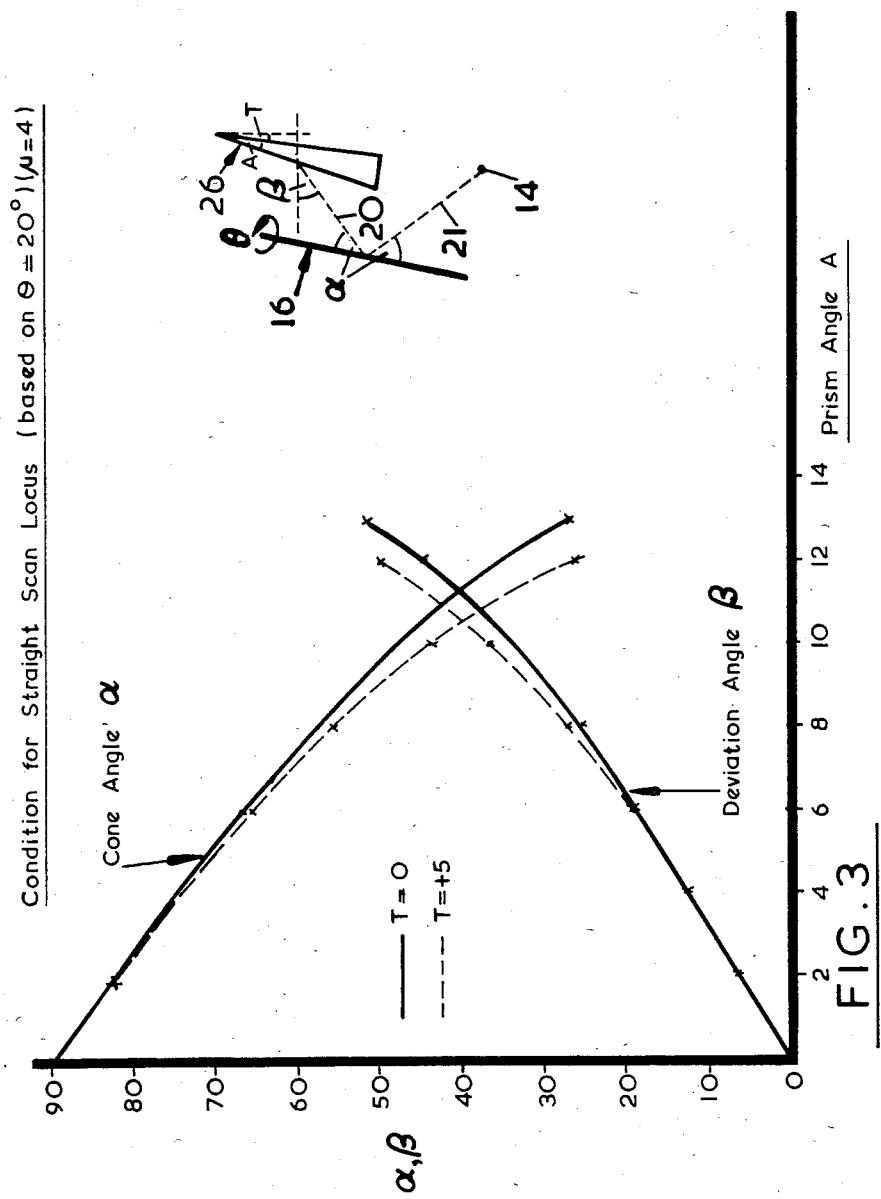

RADIATION SCANNING SYSTEMS

This invention relates to radiation scanning systems.

Radiation scanning devices which transfer radiation between radiation-transmitting and radiation-receiving stations with simultaneous mapping of a point in one station to a line in the other station are already well known. Such known devices are formed for example by one or more mirrors mounted on an oscillatory or rotary carrier mounted for movement about an axis and in order to avoid the known problem of obscuration it is necessary to provide an angular offset between the incoming and outgoing radiation beams at the device. The axis of movement of the device may either lie in the plane of the angular offset or may be perpendicular to the plane of the angular offset but in practical scanning systems the latter case is preferred because there is at least one point in one station which maps into a straight line in the other station when said other station is in the form of a distant plane whereas this is not the case when the axis of movement lies in the plane of the angular offset.

It is an object of the present invention to provide an improved form of radiation scanning system incorporating a radiation scanning device having its axis of movement lying in the plane of the angular offset and which permits at least one point in one station to be mapped into a straight line in the other station.

According to the present invention there is provided a radiation scanning system incorporating a radiation scanning device for transferring radiation between radiation-transmitting and radiation-receiving stations with simultaneous mapping of a point in one station to a line in the other station when said other station is in the form of a distant plane, said device having at least one mirror mounted on a carrier for movement about an axis and being arranged with said movement axis lying in the plane of the angular offset between the radiation beams at said device incoming from and outgoing to said stations, wherein a refractive prism corrector is located in the path of the radiation beam between said device and said other station, the vertex edge of said prism corrector being perpendicular to said movement axis, the prism corrector being such that at least one point in said one station maps into a straight line in said other station.

By virtue of the present invention practical scanning systems utilising scanning devices where the axis of movement lies in the plane of angular offset can be manufactured thereby utilising the major advantage that such devices are comparatively compact because the or each mirror is comparatively small in the direction perpendicular to the movement axis. Accordingly the energy required to oscillate or rotate the carrier is small and can be provided by a comparatively small electric motor for example.

The prism corrector, of course, requires to be transmissive of radiation within the spectral region of interest but within that limitation may have any value of refractive index. For any given value of refractive index the prism corrector may have a range of vertex angles and may be oriented with respect to the radiation beam traversing therethrough within a range of orientation angles. The values of these various prism corrector parameters are interrelated with the correction power of the corrector in straightening the line mapped in said other station from the point in said one station. Accordingly optimal selection of values provides for a substantially exactly straight line.

The present invention can also provide the still further advantage that a plurality of points in the neighbourhood of said one point in said one station, which plurality of points lie in a plane containing the movement axis and said one point, are mapped into a plurality of straight lines in the neighbourhood of said straight line in said other station. This is achieved by careful selection of the values of prism corrector parameters within the broad limits previously referred to for causing a single line in said other station to be straight. Accordingly the distortion known in the scanning system art as 'bow-tie' distortion is substantially eliminated by the presence of the prism corrector with its parameter values carefully selected. This advantage is of particular utility where a scanning system in accordance with the present invention incorporates a plurality of radiation detector elements as said points in said one station.

The present invention can also provide the further advantage when bow-tie distortion is eliminated that the presence of the prism corrector results in a variable angular scan velocity of the beam passing therethrough such that a substantially constant line scan velocity is achieved in addition to a linear scan. This advantage is of particular utility where a scanning system in accordance with the present invention is utilised as an airborne line scanner operating in the thermal infrared spectral region with said one station comprising a thermal radiation detector.

When the scanning device comprises mirrors having reflecting surfaces parallel to the axis of movement of the carrier the still further advantage arises that serial tracking errors are eliminated, that is serial points in said one station which extend in a line perpendicular to said plane are all mapped into the same line in said other station. This advantage is of particular utility where a scanning system in accordance with the present invention incorporates a plurality of serial radiation detector elements as said serial points in said one station because signal augmentation techniques, known in the art of serial detector elements, can be used to enhance sensitivity. Alternatively a single TED detector may be used in which the minority carrier drift velocity is matched to the scan velocity of the serial points as an alternative approach to enhanced sensitivity.

A still further advantage of the present invention is that there is a constant relationship between the size of the point in said one station and its conjugate at successive instants in time, which successive conjugates map the line in said other station. This is of particular utility where a scanning system in accordance with the present invention incorporates a radiation detector at said point in said one station because uniform spatial resolution of the scanned field formed by said other station is achieved.

It will be appreciated that the radiation scanning system of the present invention may be operated either in a radiation transmitting or in a radiation receiving mode according to whether a transmitter or receiver is located at said one point in said one station. In the case where the system operates in radiation receiving mode it may be desirable to compensate the system for the chromatic aberration introduced by the prism corrector if high resolution imaging is desired. This is particularly the case with thermal imaging. Such compensation can be achieved by using a compensating prism having the same wedge angle and refractive index in the beam path between the scanning device and said one station. This completely eliminates chromatic aberration at the centre of the scanned field and reduces chromatic aberration at outlying positions of the scanned field to such an extent as to be negligible for most purposes. Alternatively such compensation can be achieved by providing the corrector prism and a compensating prism of differing refractive index to form an achromatic prism located as previously explained for the corrector prism.

It will also be appreciated that the prism corrector functions as a corrector independently of the scan angle or of the number of mirrors both of which are determined by the carrier. Accordingly the scanning device may have only one mirror arranged for oscillatory or to-and-fro movement or a plurality of mirrors mounted on a unidirectionally rotating carrier.

Embodiments of the present invention will now be described by way of example with reference to the accompanying drawings, in which:

FIG. 1 diagrammatically illustrates a first embodiment of radiation scanning system according to the present invention;

FIG. 1A is a view of the FIG. 1 embodiment taken at a different angle for the purpose of illustrating features of the embodiment which are partially obscured in FIG. 1;

FIG. 2 schematically illustrates a detail of FIG. 1 and is useful in understanding the operation of the present invention;

FIG. 3 is a graph illustrating alternative parameter values of the system shown in FIG. 1;

FIG. 4 illustrates the performance of the FIG. 1 system; and

Figure 5:
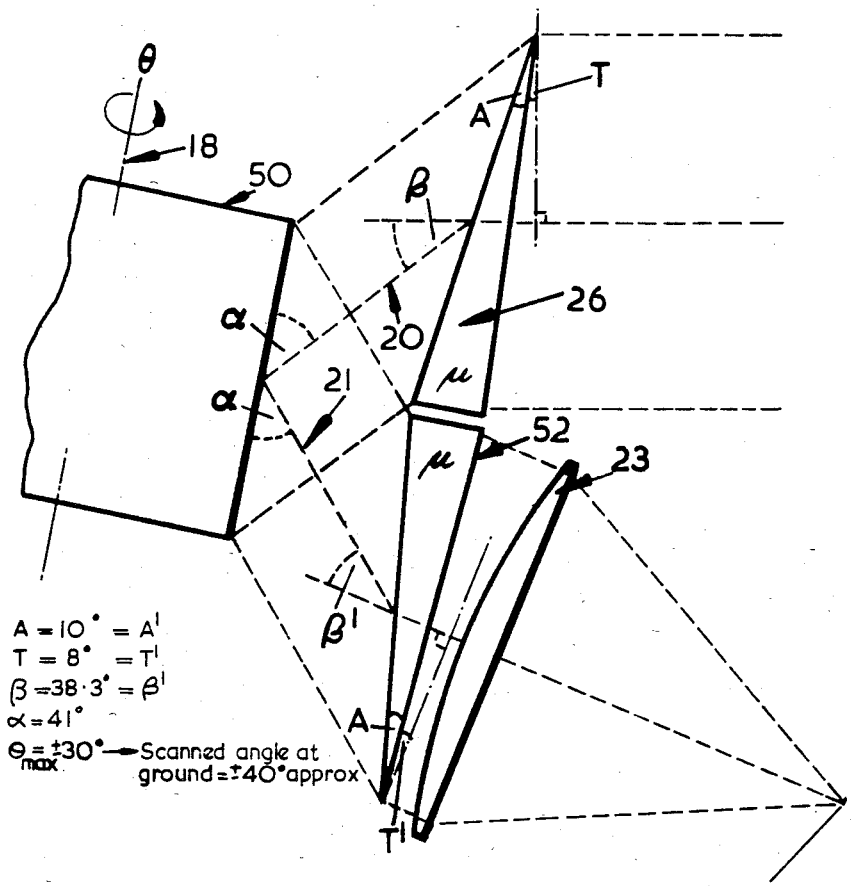

FIG. 5 diagrammatically illustrates a second embodiment of radiation scanning system according to the present invention.

As is shown in FIG. 1 of the drawings a radiation scanning system 10 comprises a radiation-receiving station 11 and a radiation-transmitting station 12 between which radiation beams are transferred by a scanning device 13 such that a point 14 in station 11 maps into a line 15 in station 12. Device 13 is formed by a planar mirror 16 mounted on a carrier 17 which is movable for example in oscillatory fashion, about an axis 18 by means of a motor 19. The radiation beam at device 13 and incoming from station 12 has an optical axis 20 which is reflected from mirror 16 to form an outgoing beam having an optical axis 21, which outgoing beam is focussed by lens 23 to coincide with point 14 after beam folding by planar static mirror 24. Axes 20 and 21 lie in a plane at all times and are mutually inclined by an angle so as to be known in the art as 'angularly offset'. Mirror 16 is perpendicular to the plane defined by axes 20,21 but axis of motion 18 lies in that plane at the centre of the scan motion as shown in the right hand portion of FIG. 1.

Prior to reaching device 13 the radiation beam from station 12 passes through a prism corrector 26 which is orientated with its vertex edge 27 perpendicular to axis of movement 18 and parallel to station 12 which is planar.

Prism 26 is illustrated in FIG. 2 together with a planar fan 29 of optical rays 29A,29B,29C etc. emanating from a point 30 and incident on prism 26 in a plane 31 extending parallel to the vertex edge 27 of the prism 26. The refracted rays 32A,32B,32C etc. no longer lie in a plane and as can be seen are incident on a planar surface 34 to form points 33A,33B,33C etc. which lie in a curved line 33. Each ray 32A,32B,32C etc. is parallel to a corresponding ray 35A,35B,35C forming a ray cone 35 so that prism 26 effectively converts planar fan 29 into an 'angular' cone 32 and because optical ray paths are reversible if the rays of cone 35 were incident on prism 26 they would be converted into an 'angular' plane of rays, i.e. each ray being parallel to a common plane.

The scanning device 13 of FIG. 1 when orientated as previously described with respect to the offset angle is already known to cause the radiation beam having optic axis 20 to scan in a cone (which is the principal reason why such scanning devices have hitherto been considered impractical) and accordingly introduction of prism 26 converts the scanned cone into an 'angular' plane and provided that station 12 is relatively distant from device 13, which is always the case in a practical scanning system, a rectilinear scan line 15 results.

FIG. 3 schematically illustrates prism 26 together with optic axes 20,21 and mirror 16 with its scan movement $\theta$ and for the specific condition of $\theta$ max=20°, and the refractive index $\mu$ of the prism being 4.0 (germanium) correlates graphically the relationships between prism vertex angle A, prism orientation angle T (i.e. tilt angle) $\alpha$, the angle at which the radiation beam with optic axis 20 is incident on mirror 16 (offset angle being $180° - 2\alpha$) and $\beta$, the angle of deviation of the radiation passing through the prism. It will be observed that to maintain scan line 15 straight (i.e. rectilinear) when angle A is small the orientation or tilt angle T of the prism is incidental but when angle A is of the order of 7 degrees or greater angle T becomes important both as regards angles $\alpha$ and $\beta$ and by increasing angle T from zero angle $\alpha$ can be reduced (and hence offset angle increased) whilst angle $\beta$ is increased. Similar families of curves exist for different values of refractive index of the prism 26 but in the interests of clarity are not shown. With regard to elimination of bow-tie distortion in the example of FIG. 3 it has been found that when $\beta$ is small bow-tie distortion is undercorrected whereas when $\beta$ is close to the critical grazing angle for the prism bow-tie distortion is overcorrected. Good correction of bow-tie distortion is achieved when $\beta$ is fairly close to the critical grazing angle and this is achieved within a relatively small range of tilt angles T for vertex angle A in the region of 10 degrees.

FIG. 4 illustrates the performance of the FIG. 1 system in that at successive instants of time point 14 has a conjugate 14' lying on line 15 in station 12, the size of conjugate 14' being constant and related to point 14 at each time instant and the separation distances between conjugates 14' being equal thereby depicting constant line scan velocity at station 12. It will be observed that in FIG. 4 there is additionally shown conjugates 9' of a second point 9 which is adjacent point 14 in station 11 and that the separation distances between conjugates 9' although equal differ from the separation distance between conjugates 14'. This can be electronically compensated where points 9,14 are representative of parallel detector elements using line stores to store the data detected, the read out from these stores being at slightly different rates. FIG. 4 also illustrates that the scanned angle at station 12 is relatively compact and it can be shown that it is less than the angle which would be scanned in the absence of the prism 26. For a given scan efficiency and scan angle this permits the use of a reduced number of mirrors 16 (on a mirror rotor) which itself may be advantageous.

In the second embodiment illustrated in FIG. 5 the scanning device is in the form of a rotor 50 having planar mirrors mounted thereon each being parallel to movement axis 18. In addition to corrector prism 26 which is as previously described a compensator prism 52 is provided intercepting the radiation beam with optic axis 21 for the purpose of achieving compensation of chromatic aberration introduced by prism 26. Prism 52 has the same refractive index $\mu$ and vertex angle A as prism 26 and is tilted with the same orientation or tilt angle T but relative to the outgoing beam.

What is claimed is:

1. A radiation scanning system incorporating a radiation scanning device for transferring radiation between radiation-transmitting and radiation-receiving stations with simultaneous mapping of a point in one station to a line in the other station when said other station is in the form of a distant plane, said device having at least one mirror mounted on a carrier for movement about an axis and being arranged with said movement axis lying in the plane of the angular offset between the radiation beams at said device incoming from and outgoing to said stations, wherein a refractive prism corrector is located in the path of the radiation beam between said device and said other station, the vertex edge of said prism corrector being perpendicular to said movement axis, the prism corrector being such that at least one point in said one station maps into a straight line in said other station.

2. A system as claimed in claim 1, comprising a prism compensator located in the path of the radiation beam between said device and said one station, the prism compensator having the same wedge angle, refractive index and orientation angle as the prism corrector whereby to render the system substantially achromatic.

3. A system as claimed in claim 1, wherein the prism corrector is an achromatic prism.

4. A system as claimed in claim 1, wherein the prism corrector is made of germanium and has a wedge angle (A) of 14° or less.

5. A system is claimed in claim 1 wherein the prism corrector is made of germanium and with respect to the optical axis of the radiation beam between the prism corrector and said other station the prism corrector is orientated at an orientation angle (T) of 8° or less.

6. A system as claimed in claim 1, comprising a radiation detector at said point in said one station.

7. A system as claimed in claim 1, comprising a plurality of serial radiation detector elements at serial points in said one station which extend in a line perpendicular to the plane of angular offset.

8. A system as claimed in claim 1, comprising a single TED detector extending along serial points in said one station which extend in a line perpendicular to the plane of angular offset, the scan velocity of the serial points being matched to the minority carrier drift velocity of the detector.

9. A system as claimed in claim 1, wherein said scanning device comprises a single mirror mounted for oscillatory rotary movement.

10. A system as claimed in claim 1, wherein said scanning device comprises a plurality of mirrors mounted on a unidirectionally rotating carrier.

* * * * *